(No Model.) 4 Sheets—Sheet 1.
F. B. CROCKER & C. G. CURTIS.
ELECTRIC BATTERY.
No. 358,386. Patented Feb. 22, 1887.
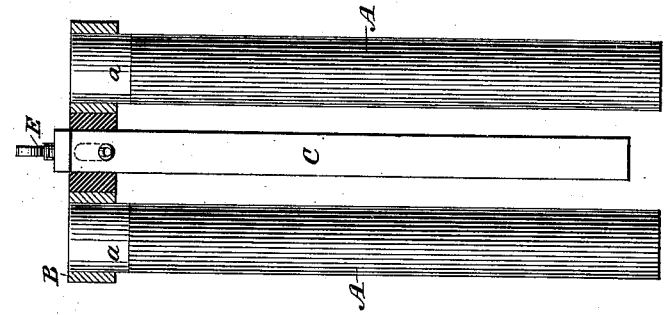
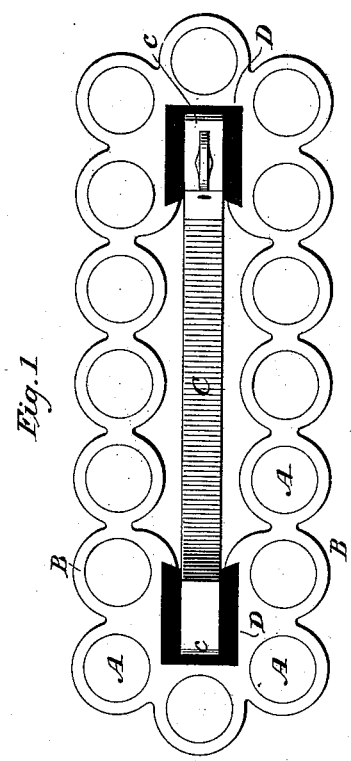
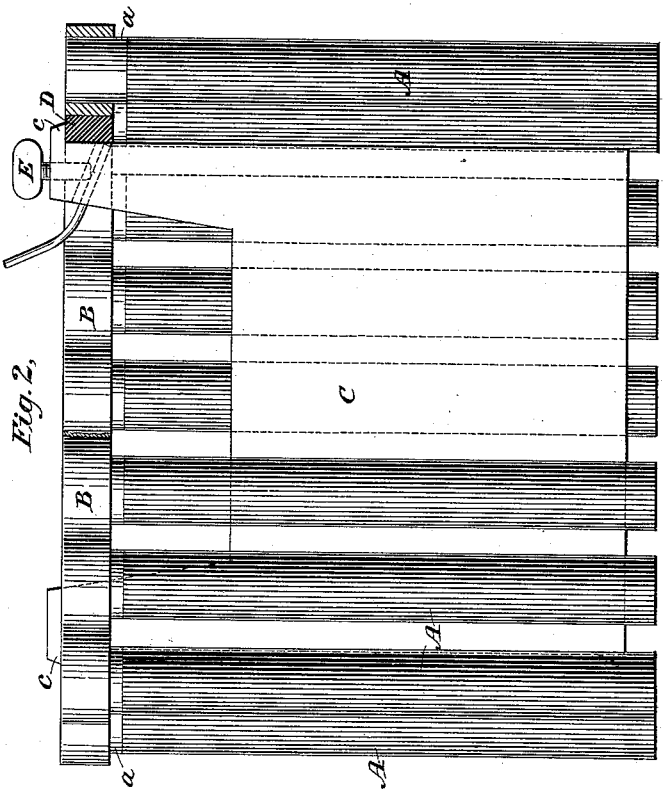
Witnesses
Geo. W. Breck.
Chas. J. Maguire.
Inventors
Francis B. Crocker
Charles G. Curtis

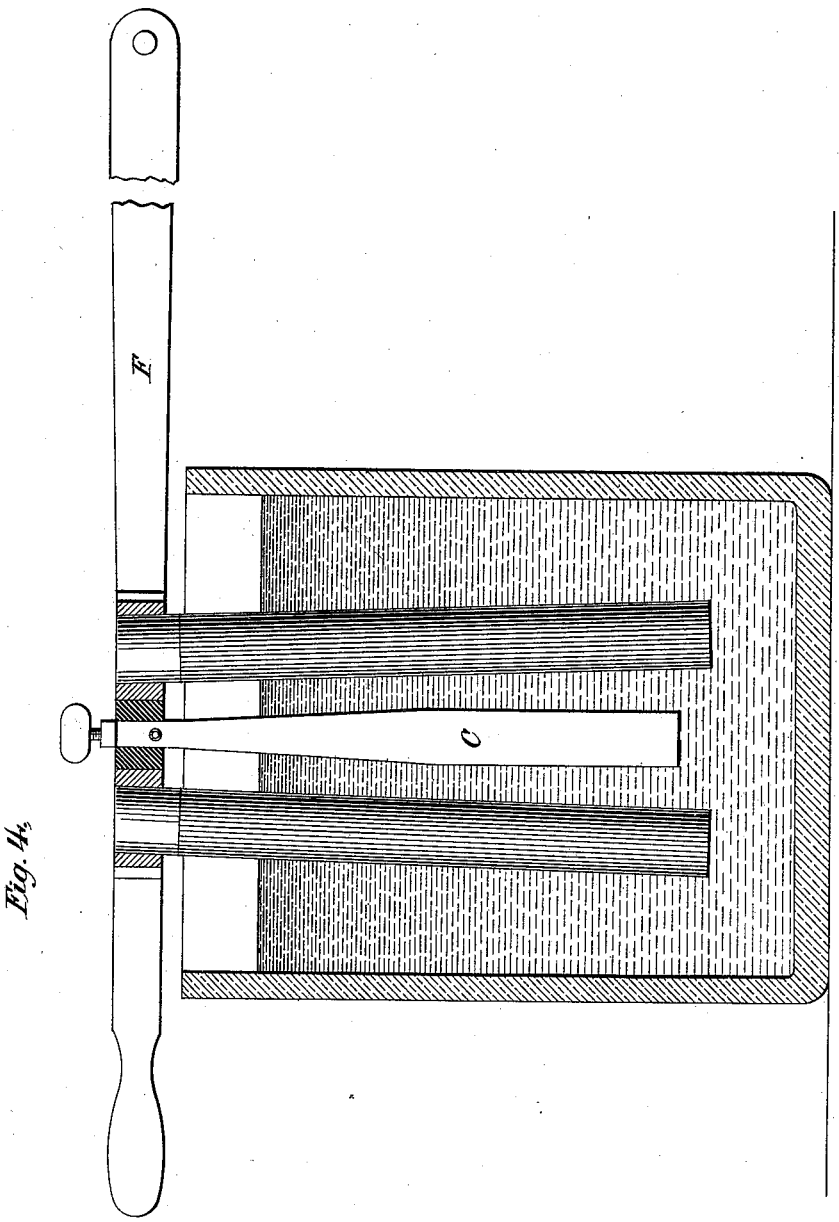

(No Model.) 4 Sheets—Sheet 3.
F. B. CROCKER & C. G. CURTIS.
ELECTRIC BATTERY.
No. 358,386. Patented Feb. 22, 1887.
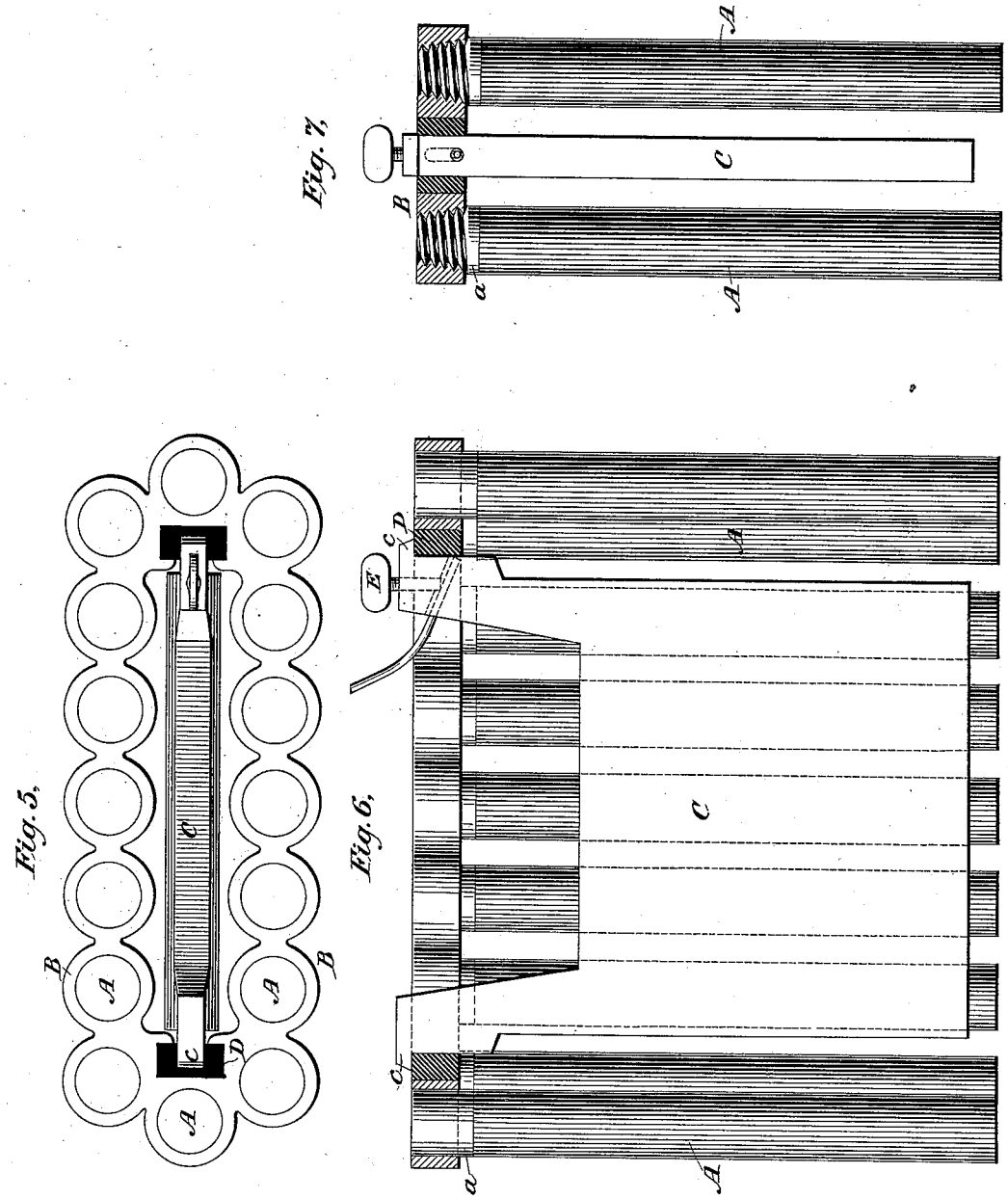
Witnesses
Geo. W. Breck.
Chas. J. Maguire
Inventors
Francis B. Crocker,
Charles G. Curtis (No Model.) 4 Sheets—Sheet 4.
F. B. CROCKER & C. G. CURTIS.
ELECTRIC BATTERY.
No. 358,386. Patented Feb. 22, 1887.
Fig. 8,
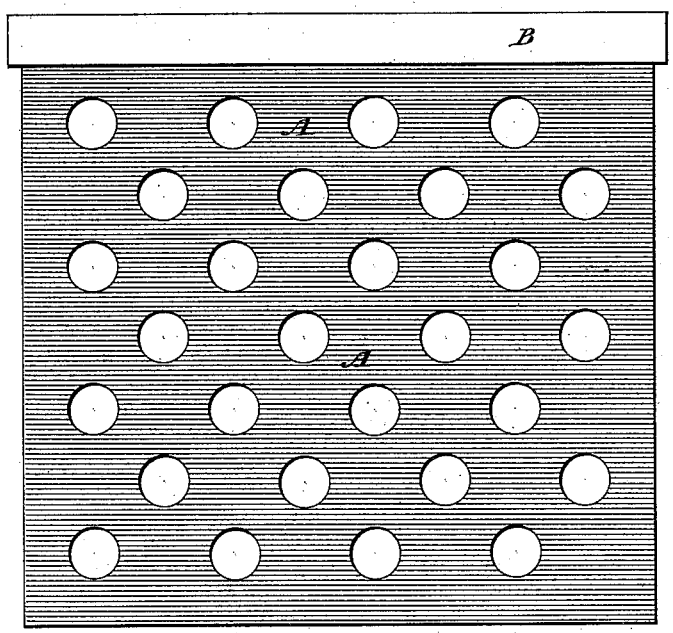
Fig. 9,
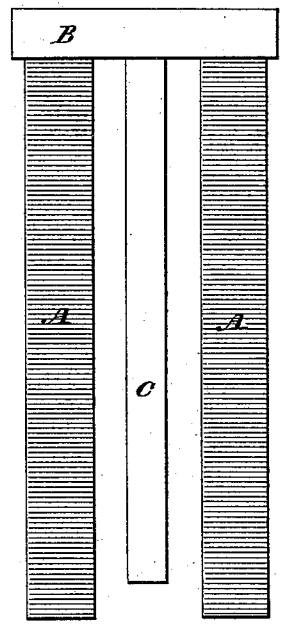
Fig. 10,
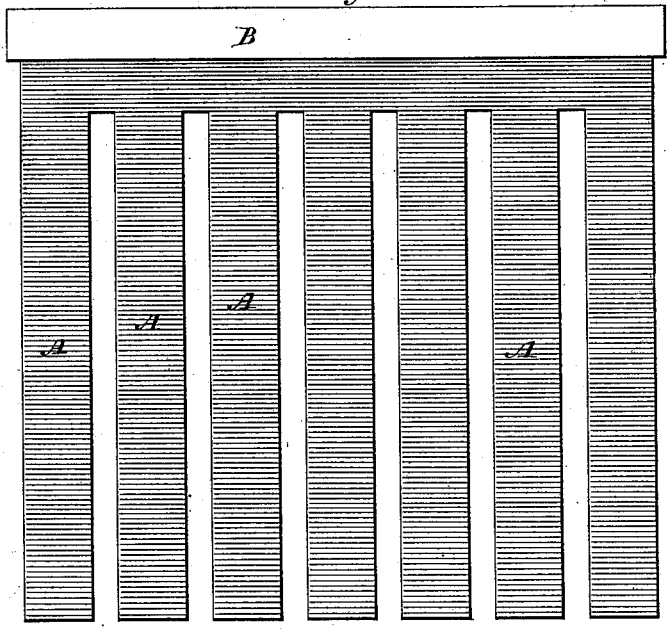
Witnesses
Geo. W. Breck
Chas. J. Maguire
Inventors
Francis B. Crocker
Charles G. Curtis

UNITED STATES PATENT OFFICE.

FRANCIS B. CROCKER AND CHARLES G. CURTIS, OF NEW YORK, N. Y., ASSIGNORS TO THE C. & C. ELECTRIC MOTOR COMPANY.

ELECTRIC BATTERY.

SPECIFICATION forming part of Letters Patent No. 358,386, dated February 22, 1887.

Application filed March 29, 1886. Serial No. 196,933. (No model.)

*To all whom it may concern:*

Be it known that we, FRANCIS B. CROCKER and CHARLES G. CURTIS, both of the city and State of New York, have invented certain Improvements in Electric Batteries, of which the following is a specification.

In electric batteries in which the negative or carbon and the positive or zinc electrodes are made in the form of plates, which are immersed in the acting solution, the amount of current or the number of ampères that a given size battery is capable of supplying and continuously maintaining for any length of time is extremely limited, and is much too low for many practical purposes, owing to the fact that the acting liquid or material becomes used up or exhausted at the surface of the carbon plate more rapidly than fresh or active solution can flow in and there present itself, so that if it is attempted to draw a current of more than a certain strength from such a battery the electro-motive force declines almost immediately, and consequently it is absolutely necessary to employ either a large number of such cells or a few cells of very large size, in order to obtain a sufficient amount of current for many practical purposes, such as furnishing power or light.

The principal object of our invention is to provide a battery of very greatly increased power—that is, one which shall be capable of supplying and properly maintaining a very high current strength or a large number of ampères, and at the same time to reduce the internal resistance of the battery to the lowest possible amount, so as to make the efficiency of the battery as high as possible without reducing its power.

To this end our invention consists in combining with the zinc or positive plate a carbon plate made in the form of a grating or wall provided with spaces or openings, through which the fresh acting solution or liquid is admitted from the outside surface of the wall or grating to the surface nearest to the zinc plate, and thus enable a circulation of the solution to go on, which will constantly bring fresh or unused liquid to the proper point to maintain the action and displace the old or spent solution as fast as it becomes exhausted in the electrolytic action, as we shall more fully explain.

Our invention also includes certain details of construction, which we have devised to enable our invention to be readily made and used in practice.

Our invention is represented in the accompanying drawings, in which Figure 1 is a top view of the zinc and carbon electrodes; Fig. 2, a side view showing some of the carbons removed; and Fig. 3 an end view of the same, showing our invention in one form. Fig. 4 is an end view; Fig. 5, a top view, and Fig. 6 a side view showing a modification of our invention, in which the zincs are of an improved form. Fig. 7 shows another mode of attaching and connecting the carbon or negative electrodes to the holder according to our invention. Figs. 8, 9, and 10 are side and end views showing modified forms of our carbon or negative electrodes.

In Figs. 1, 2, 3, 4, 5, 6, and 7 we have shown our electrodes in the form of a wall or grating made up of separate carbons, bars, or pencils A A A, &c., arranged vertically on each side of the zinc plate. The round carbons—such as are used for electric lighting—are well adapted to this purpose, though of course these rods may be made elliptical, flattened, square, or any other shape, if desirable. They may be arranged and supported in any desired way, sufficient space being left between them to allow sufficient circulation of the liquid to maintain the required current, and they may be placed at any desired distance from the zinc plate, depending upon the internal resistance required, and whether a porous cup or partition is interposed between them and the zinc. These carbon rods or pencils may evidently be supported and electrical connection made with them in various ways; but we have devised a very simple mounting which holds the carbons firmly in place and secures a good and reliable electrical connection with them. It consists of a skeleton frame or holder, B, cast, stamped, or otherwise formed of any suitable metal or material, and having holes or recesses into which are fitted the carbon rods A. To obtain the most perfect connection with the carbons, we electroplate the ends of the carbons where they enter the holder B with a thin plating of copper, a, and after the plated ends have been inserted in the holder B we solder the copper coating to the metal holder B, thus securing the carbons rigidly in place and making an excellent electrical connection therewith. The zinc plate C is arranged to stand between the two rows of carbon pencils, and in order that it may readily be replaced by new ones, when it is used up, we form the holders B with a sufficient space in the middle to receive the zinc plate, which fits into and is supported by shoulders $c\ c$, resting upon insulating-blocks D D, which serve to hold the zinc firmly in place without allowing it to touch or connect with the carbon-holder B. The zincs, being provided with connecting-screws E, or any other convenient means of connecting the wire to them, can be removed and replaced immediately by simply disconnecting the wire and lifting them out of their holders and dropping new ones in place. As the liquid or solution in the battery never stands above a certain point on the carbon rods, the zinc plates, which of course may be cast or otherwise formed, may be cut away at their upper part down to the highest level at which the liquid stands, as we have shown in the drawings, in order to reduce the weight and the unused portion of the zinc as far as possible. Of course the zincs in our battery may be mounted or supported in any desired way, and may be supported by or attached to other parts of the battery besides the carbon-holders B.

After the carbon rods A A have been fitted in the holder B so as to connect with the holder, the holder and carbons should be inverted and immersed in melted paraffine or some other suitable material for some little distance beyond the holder B, and boiled for some time, so that the paraffine will penetrate the carbon and prevent the fluid in the battery from creeping up and destroying or injuring their connections with the holder.

In our battery a porous cell or diaphragm between the positive and negative electrodes may be used in the ordinary way, or both electrodes may be immersed in the same solution or liquid without any porous cell or diaphragm, in which case the resistance of the battery is very much less, and consequently its power is much greater, and at the same time the battery is much simpler and more easily taken care of than if a porous cell were used. If no porous cell be used and the zinc or positive element stands in the acting solution or liquid, it is important that the zinc should be arranged so that it can readily be withdrawn from and immersed in the solution, in order to avoid local action upon the zinc when no current is being drawn from the battery. In Fig. 4 we have shown the zinc so mounted that by raising and lowering the lever F the zinc can be immersed to any desired depth in the solution. We have also shown the carbons attached to the same lever, so that they rise and fall with the zinc for convenience in handling the battery, and consequently when the zinc is withdrawn from the solution the battery-jar contains nothing but the solution, which can easily be removed without having to remove or clean any other parts.

A good solution for this form of battery is the ordinary bichromate-of-potash solution made up of sulphuric acid and bichromate of potash dissolved in water in about the proportions of eight parts of bichromate of potash, ten parts of sulphuric acid, and fifty parts of water, by weight. With a solution of this kind, and with our improved form of carbon grating or open-work electrode and no porous cell, we have found that the fresh solution is admitted to the zinc side of the carbon plate or grating rapidly enough, and sufficient circulation is obtained to enable a given size battery to supply and continuously maintain until the solution is almost completely exhausted a very large amount of current, varying from one quarter to two or even more ampères per square inch of surface of the zinc-plate—an amount many times greater than has ever been obtained before. At the same time if in our battery the electrodes are kept immersed just enough to maintain the required current and no more, almost all the chemical action is expended in generating current, and the local action is reduced to a very low amount. In cases where sometimes more and sometimes less current is required from this kind of battery, the amount of current which it furnishes to a given circuit may be nicely controlled by varying the depth of immersion of the electrodes, and consequently the resistance of the battery. In such cases, when the solution is fresh, a small immersion of the electrodes will give the necessary current; but as the solution becomes more and more used the electrodes require to be immersed farther and farther, in order to maintain the same current, until, when the same solution is nearly spent, the full immersion is required. Consequently the zinc plate is acted upon mostly and consumed much more rapidly at its lower end, so that if it is of the same thickness throughout the lower part disappears before the upper part is consumed. To overcome this difficulty and enable the zinc to be used until it is practically all consumed, we have devised a form of zinc in which the lower portion or part which is acted upon most is thicker, or contains more metal than the upper portion, as we have shown in Figs. 4, 5, and 6, and by properly proportioning the amount of metal in the upper and lower parts, according to the conditions under which the battery is used, the plates may be made so that all parts of the plate give out at once. If this form of zinc be used in one of our holders, B, it is evidently necessary that the opening in the holder B should be large enough to allow the thick part of the zinc to pass, as shown in Figs. 5 and 6.

In Fig. 7 we have shown another mode of mounting the carbons which we have devised. In this arrangement the holders or frames B are formed with taper-threaded holes, and the ends of the carbon are correspondingly threaded and screwed into these holes, the carbons being either left naked or copper-plated before being screwed in place.

In Figs. 8, 9, and 10 are shown other forms of our improved circulation carbon electrodes in which the carbon plates, instead of being made in the form of a grating composed of a row of carbon rods or pencils, are made of carbon plates which are provided with holes or openings distributed over the plate to admit the fresh liquid to the inner surface of the plate, and thus secure the desired circulation according to our invention.

In Fig. 10 our electrode is shown as made of a plate, in which are formed or cut vertical slits or spaces of the proper width, thus forming a grating with sufficient spaces between the bars to maintain the desired circulation.

What we claim as our invention, and desire to secure by Letters Patent, is—

1. The combination, in a battery, of a negative element formed of two parallel walls having openings or passages therethrough, a continuous conductive support for the said walls, and a positive element consisting of a solid plate interposed between and insulated from the walls of the negative element and sustained by said support, substantially as and for the purpose set forth.

2. The combination, in an electric battery, of a negative element consisting of a holder of conducting material supporting two parallel carbon walls or rows of rods, the said holder having a central opening, and a positive element consisting of a plate fitting said opening in the holder and resting upon insulated supports attached to said holder at the ends of the opening, substantially as described.

FRANCIS B. CROCKER.
CHARLES G. CURTIS.

Witnesses:
GEO. BRUSH,
CHAS. J. MAGUIRE.